Sept. 25, 1962    G. N. GOODIER ETAL    3,056,078
REGULATED HIGH VOLTAGE POWER SUPPLY
Filed Nov. 1, 1960
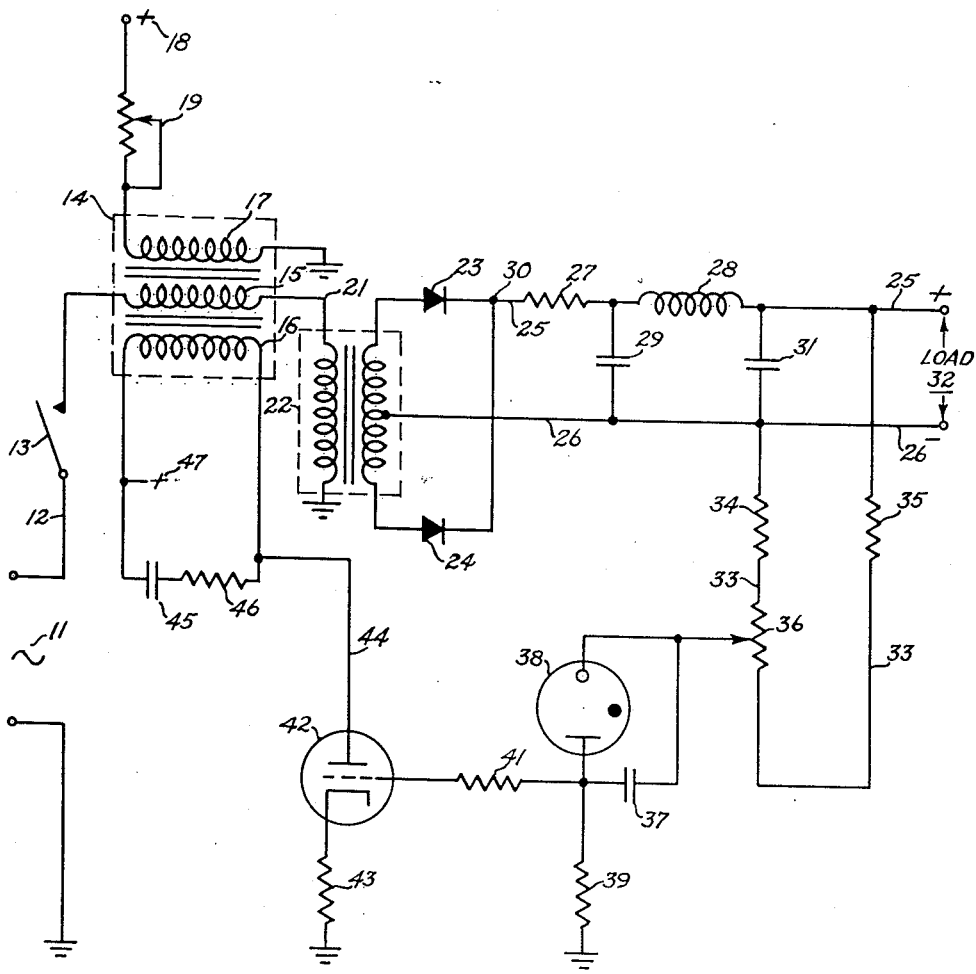
INVENTORS
GEORGE N. GOODIER
WALTER L. WUSTER
BY
ATTORNEYS United States Patent Office 3,056,078
Patented Sept. 25, 1962

3,056,078
REGULATED HIGH VOLTAGE POWER SUPPLY
George N. Goodier and Walter L. Wuster, Indianapolis, Ind., assignors to the United States of America as represented by the Secretary of the Navy
Filed Nov. 1, 1960, Ser. No. 66,673
2 Claims. (Cl. 323—66)
(Granted under Title 35, U.S. Code (1952), sec. 266)

The invention described herein may be manufactured and used by or for the Government of the United States of America for governmental purposes without the payment of any royalties thereon or therefor.

The present invention relates generally to improvements in electrical power supplies and the like and more particularly to new and improved regulated high voltage power supplies wherein a saturable reactor or magnetic amplifier is utilized in conjunction with various control circuitry to provide a novel form of regulation.

Those concerned with the development of military electronics equipment have long been aware of the need for a high voltage power supply having close regulation and yet possessing the necessary ruggedness and stability required of military field equipment. Such a unit must be more economical to construct, smaller and more compact in size, and provide better regulation than units of the prior art because of its use in high performance aircraft missiles, rockets, and satellites which must necessarily operate throughout a wide range of environmental conditions. Presently available units having the regulation necessary, lack the compactness required because of the number of components essential to their operation, and are unable to function within necessary specifications over the increasingly wide environmental range.

The present invention overcomes these disadvantages of the prior art by utilizing novel control circuitry to provide a regulated high voltage power supply having fewer components than previous comparable units and yet providing quite satisfactory operation over a much wider range of environmental conditions. To attain this, the present invention contemplates a unique control circuit-power supply arrangement wherein a saturable reactor or magnetic amplifier, in conjunction with a control triode tube and a corona discharge regulating tube, is coupled with high voltage transforming and rectifying circuitry to create a unit for providing a regulated high voltage for use in traveling wave tubes or any other circuitry requiring such a voltage.

An object of the present invention is the provision of a high voltage power supply.

Another object is to provide a new and improved electromagnetic control circuit for regulating a high voltage supply.

A further object of the invention is the provision of a high voltage power supply utilizing fewer components than those of the prior art.

Still another object is to provide a regulated high voltage power supply having increased ruggedness and stability.

Yet another object of the present invention is the provision of a regulated high voltage power supply adapted to perform satisfactorily over a wide range of environmental conditions.

Other objects and features of the invention will become apparent to those skilled in the art as the disclosure is made in the following detailed description of a preferred embodiment of the invention as illustrated in the accompanying sheet of drawing in which the single FIGURE of drawing is a schematic diagram of a preferred form of the invention.

Referring now to the FIGURE of drawing there is shown a specific embodiment of the invention in which an alternator 11 provides an alternating current via lead 12 through a switch means 13 to gate winding 15 of a saturable reactor 14. Saturable reactor 14 has a bias level winding 17 and a control winding 16. A direct current bias voltage is supplied from source 18 via potentiometer 19 to an end of bias winding 17 which has the other end connected to ground. The gate winding 15 of reactor 14 is further coupled through lead 21 to the ungrounded end of the primary winding of high voltage transformer 22 which has a secondary winding provided with a center-tap. The ends of the secondary winding of transformer 22 are coupled through diodes 23 and 24, arranged to provide full-wave rectifying action for the transformed alternating current high voltage, to lead 25 and the center-tap is coupled to lead 26; the full-wave rectified high voltage is then coupled via leads 25 and 26 through resistance 27 which limits surge currents and a pi-section filter for reducing ripple composed of inductance 28 and capacitances 29 and 31 to a load 32.

A voltage control loop 33, which is coupled across output leads 25 and 26, is composed of potentiometer 36 and resistances 34 and 35. These resistances limit the range of potentiometer 36 and in conjunction with capacitance 37 serve to control and bypass transient voltage spikes, and thus prevent upsetting high voltage corona discharge regulating tube 38 whose cathode is connected to the movable tap of potentiometer 36. Potentiometer 36 is utilized to control the value of regulated output voltage supplied to the load within a range determined by design characteristics. The anode of regulating tube 38 is coupled through resistance 39 to ground, and through resistance 41 to the grid of amplifier control tube 42 whose cathode is coupled through resistance 43 to ground. Triode 42 has its anode coupled through lead 44 to control winding 16 of saturable reactor 14. Winding 16 is further connected in parallel with the series combination of capacitance 45 and resistance 46, which are placed in the control winding circuit to eliminate parasitic oscillations. A common junction of these two parallel branches is further connected to a source of positive potential 47.

The operation of the invention is as follows. An alternating current is provided to gate winding 15 of saturable reactor 14 from a suitable source 11 via lead 12 and switch means 13 which is in a closed position during operation of the supply. This current passing through gate winding 15 causes a voltage drop across that winding which is proportional to its impedance. Its impedance is, in turn, proportional to the sum of direct currents present in bias winding 17 and control winding 16. An increase in the sum of these currents increases the degree of saturation of the core of reactor 14 which, in turn, causes the impedance exhibited by gate winding 15 to decrease, thereby resulting in a decreased voltage drop across winding 15. Bias winding 17 and associated circuitry including potentiometer 19 and positive direct current source 18 serve to maintain the saturation of reactor 14 at a level which produces the maximum desirable impedance in gate winding 15. The current in bias winding 17 thereby prevents the impedance in gate winding 15 from becoming excessively high, which if allowed to occur would cause an excessive voltage drop across winding 15. Lead 21 carries the alternating current from winding 15 of reactor 14 to the primary winding of high voltage transformer 22, and from transformer 22 it is returned through ground to source 11.

The alternating current flowing in the primary of transformer 22, through step-up action, induces a high potential alternating current in its center-tapped secondary. This high potential alternating current flows through the full-wave rectifying configuration of diodes 23 and 24, thereby appearing at terminal 30 as a high potential direct current. This direct current flows, by means of lead 25, through surge limiting resistance 27 and the pi-section ripple reducing filter composed of inductance 28 and capacitances 29 and 31 to the positive terminal of load 32. It then passes through the load and back to the center-tapped secondary of transformer 22 via lead 26.

Voltage control loop 33 is coupled across leads 25 and 26 to provide a potential proportional to the load voltage, through output voltage controlling potentiometer 36, to the cathode of high voltage corona discharge regulating tube 38. Any change in output voltage, whether caused by changing load conditions or supply variations from source 11, is reflected in the cathode voltage supplied to regulating tube 38 via control loop 33 and potentiometer 36. The regulation action of corona discharge tube 38 is such that should the voltage across the tube attempt to change due to a load variation or line voltage fluctuation, the current through the tube will change but the voltage drop across the tube will be maintained constant. This change in current through the tube results in a change in the voltage being developed across resistors 39 and 41 in the anode circuit of the tube which is applied to the grid of control triode 42. A change in the grid voltage applied to triode 42 will cause a change in the current flow through tube 42 and, via lead 44, through control winding 16 of saturable reactor 14. The change in current flow through winding 16 causes a change in the degree of saturation of the core of reactor 14 and thereby varies the impedance presented to the flow of current through gate winding 15. This change in current is reflected first in the primary winding of high voltage transformer 22 and then through transformer action to its secondary where it is conveyed via leads 25 and 26 to the load 32.

It is assumed for purposes of explanation that load 32 has suddenly increased, causing the voltage across output leads 25 and 26 to tend to decrease below the desired value thus requiring regulatory action which will occur in the following manner. Control loop 33 will sense the decrease in potential and the voltage across regulator tube 38 will also attempt to decrease. However, the regulation action of tube 38 is such that the current through the tube will decrease and yet maintain a constant voltage across it. This decreased current flow will result in a less negative (or more positive) voltage being developed across resistances 39 and 41, and applied to the grid of triode 42. This less negative voltage on the grid of triode 42 will cause an increase in the current flow through the triode to lead 44 and control winding 16. This increase in current through winding 16 causes an increase in the degree of saturation of the core of reactor 14, which in turn decreases the impedance of gate winding 15 thereby allowing more current to flow from source 11 to the primary winding of high voltage transformer 22. Thus the load voltage tends to rise to its desired level.

If, due to a decrease in load 32, the load voltage were to rise above the desired level, regulatory action would take place in an opposite manner to lower the output voltage to the prescribed level.

Thus it becomes apparent from the foregoing description and annexed drawing that the invention, a versatile highly reliable regulated high voltage power supply, is a useful and practical unit having many applications in both industrial and military equipment. The usefulness of the device is enhanced by its advantages of construction which include lower cost due to more simple circuitry requiring less special tubes and parts, and a more rugged and stable unit effected through the utilization of a saturable reactor as the control means.

It should be understood, of course, that the foregoing disclosure relates to only a preferred embodiment of the invention and that numerous modifications or alterations may be made therein without departing from the spirit and the scope of the invention as set forth in the appended claims.

Having thus described the invention, what is claimed is:

1. A regulated high voltage power supply comprising: an alternating current voltage source having one terminal grounded; a saturable reactor having at least a gate winding, a control winding, and a bias winding, said gate winding having one terminal lead thereof connected to the ungrounded terminal of said alternating current voltage source, said control winding having one terminal lead connected to a source of positive direct current potential, and said bias winding being coupled in series with a variable impedance in a direct current circuit for maintaining the degree of saturation of the core of said saturable reactor at an adjustable desired minimum level in order to fix the maximum value of impedance desirable for said gate winding to exhibit to the flow of current therethrough; a high voltage power transformer having a primary winding and at least a center-tapped secondary winding with said primary winding coupling the other terminal lead of said gate winding therethrough to ground and with each terminal lead of said secondary winding being coupled through diode rectifying means to a common terminal for rectifying the high voltage output of said high voltage power transformer from said alternating current voltage source; a suitable load having positive and negative terminal means, said positive terminal means of said load being coupled through a ripple reduction filter circuit to said common terminal and said negative terminal means of said load being coupled to the center tap of said secondary winding for providing a direct current voltage to said load; a load voltage sensing circuit including a potentiometer having its fixed resistance terminals coupled respectively through limiting resistors to said positive and negative terminal means of said load to provide an indication, in the form of a control voltage at the adjustable tap of said potentiometer of any tendency toward variation in said load voltage; a voltage regulating corona discharge tube having the cathode thereof coupled to the variable tap of said potentiometer and the anode thereof coupled through an anode resistor to ground for developing across said anode resistor a current proportional to changes in said load voltage; and a triode amplifier tube having the control grid thereof coupled through a control grid resistor to the anode of said corona discharge tube, having the cathode thereof coupled through a cathode resistor to ground, and having the anode thereof coupled to the other terminal lead of said saturable reactor control winding, said control grid resistor developing a control voltage thereacross to enable said triode amplifier tube to vary the anode current flow in said control winding thereby varying the level of saturation of the core of said saturable reactor which in turn changes the impedance presented to the flow of alternating current through said primary winding of said high voltage power transformer in such a manner as to correct any tendency toward change in said rectified voltage to said load.

2. In combination with a source of alternating current voltage having first and second terminal means for supplying power to a load, a regulated high voltage power supply comprising: a high voltage step-up power transformer having a primary winding and at least a center-tapped secondary winding, one end of said primary winding being coupled to ground and each end of said secondary winding being coupled through a respective diode rectifying means to a common terminal means; a suitable high voltage load having positive and negative terminal means for receiving power from said source of alternating current voltage via said power transformer, said positive terminal means being coupled to said common terminal means and said negative terminal means being coupled to the center tap of said secondary winding; a saturable reactor having at least a gate winding, a bias winding, and a control winding, said gate winding having one end terminal thereof coupled to the other end of said primary winding of said power transformer and the other end terminal thereof coupled to said first terminal means of said source of alternating current voltage which has its said second terminal means coupled to ground, said bias winding having one end terminal thereof coupled to ground and the other end coupled via a variable impedance means to a source of direct current potential for maintaining the degree of saturation of the core of said saturable reactor at an adjustable desired minimum level in order to fix the maximum value of impedance desirable for said gate winding to exhibit to the flow of current through the primary winding circuit of said power transformer, and said control winding having one end terminal thereof coupled to a source of positive direct current potential; a load voltage sensing loop consisting of a potentiometer having one end of its fixed resistance coupled via a limiting resistance to said positive terminal means of said load and the other end coupled via a second limiting resistance to said negative terminal means of said load, said voltage sensing loop serving to monitor the high voltage direct current potential present at said terminal means of said load; a voltage regulating corona discharge tube having the cathode thereof coupled to the variable tap of said potentiometer and having the anode thereof coupled via an anode resistor to ground; and a triode amplifier tube having the control grid thereof coupled via a control grid resistor to said anode of said corona discharge tube, having the cathode thereof coupled via a cathode resistance to ground, and having the anode thereof coupled to the other end terminal of said control winding, said load voltage sensing loop, said voltage regulating corona discharge tube, said triode amplifier tube, said control winding, and associated coupling circuitry forming a voltage regulating control circuit whereby any tendency toward change in the potential across said positive and negative terminals of said load will be sensed by said sensing loop and conveyed, in the form of a current variation, through said voltage regulating tube to said grid control resistor which develops a voltage drop thereacross proportional to the tendency of variation of the load voltage, which is supplied to the grid of said amplifier tube causing a proportional variation in the flow of control winding current thereby varying the saturation level of the core of said saturable reactor to change the amount of impedance present in said primary winding circuit of said power transformer and thereby regulating the amount of voltage induced in any secondary windings thereof.

References Cited in the file of this patent
UNITED STATES PATENTS

| | | |
|---|---|---|
| 2,443,006 | Johnson | June 8, 1948 |
| 2,794,915 | Wadey | June 4, 1957 |
| 2,970,252 | Obenberger et al. | Jan. 31, 1961 |